INVENTOR
WILLIS FORD KARR
BY *Allen M Krass*
ATTORNEY

United States Patent Office 3,386,713
Patented June 4, 1968

3,386,713
AUTOMATED KILN
Willis Ford Karr, Warren, Mich., assignor to Stearns Manufacturing Company, Inc., Flat Rock, Mich., a corporation of Michigan
Filed Sept. 8, 1965, Ser. No. 485,867
8 Claims. (Cl. 263—6)

ABSTRACT OF THE DISCLOSURE

A cylindrical housing with a spiral track formed of a pair of horizontally spaced track sections for supporting a series of block carrying pallets for movement through a controlled curing atmosphere. Upper and lower circular tracks formed concentrically about the central vertical axis of the housing support a series of spaced pusher frames which extend vertically between the spiral track sections and are intermittently advanced along the circular tracks to progressively move the pallets along the spiral track from the inlet to the outlet of the housing.

This invention relates to a kiln for curing molded masonry articles under various conditions of temperature and humidity and more particularly to such a kiln and a novel conveying system adapted to move the articles through the kiln.

Concrete articles such as masonry blocks are formed by pouring wet concrete into a mold that is shaped to form one or more of the articles and is supported on a flat pallet. The mold is then removed and the pallet is either moved to a drying area where the blocks are allowed to cure for periods ranging up to several weeks, or the pallets are moved to a kiln where they are more quickly cured in an environment of heat and steam. Blocks produced by this latter kiln curing process have superior physical properties to those whoch are air dried and the additional advantages of kiln curing, such as the speed with which the finished block may be produced and the smaller physical area required, have lead to a rapid increase in the popularity of kiln drying technique in the past few years.

While most kilns operate on a "batch" method wherein a load of blocks are placed in the kiln at normal temperatures and the kiln temperature is raised and maintained for the necessary curing period and then slowly brought down to normal so that the blocks may be removed, it has previously been proposed to provide "automated" kilns which operate on a continual flow of blocks that move into, through and out of the kiln via some form of material handling arrangement. The present invention is addressed to such an automated kiln and more particularly to a unique material handling appaartus designed to provide a continual flow of articles through a processing area and adapted for use for other processes as well as in the novel combination with a block curing kiln.

As disclosed in the following description of the preferred embodiment of the inventive apparatus, the kiln takes the form of a large cylindrical enclosure provided with suitable equipment for generating the desired temperature, humidity and/or pressure atmosphere and formed with removable side panels so that access may be had to the interior of the kiln for maintenance purposes. The material handling apparatus includes a pair of elongated spiral tracks winding along the interior of the kiln wall, one abreast of the other. These tracks are equipped with rollers that are adapted to support a pallet containing one or more concrete blocks, between a pair of tracks. The blocks enter the track through a vestibule door located at the lower end of the kiln and are slowly pushed along the length of the track, in a spiral upward direction, until they reach the top of the track where they pass out of the kiln through either a vestibule door, or through an enclosed tunnel leading to another kiln where the process is continued while the blocks move down a spiral track. Any number of kilns may be arranged in series in this manner. The mechanism which pushes the block supporting pallets along the track consists of a number of vertical pusher rods supported at their upper and lower ends on horizontally aligned circular rails for rotation about the axis of the kiln. The pusher rods pass between the two sides of the tracks which retain the pallets and thus push against the pallets as the rods are rotated along their upper and lower supports. This rotation is accomplished by a cylinder actuated index mechanism that connects to all the rods through a series of flexible links. Thus, each pallet is pushed along the spiral track by one rod, which also pushes a number of other pallets at other levels. As the pallet moves along the track, its contact with the rod slides upwardly along the rod. In this manner, a single power source imparts simultaneous motion to all of the pallets retained within the kiln in a structurally simple and reliable manner.

It is therefore seen to be a primary object of the present invention to provide material handling apparatus adapted to move a large number of work supporting pallets through a processing or storage area which apparatus consists of a spiral track adapted to support the pallets on roller means and includes a pusher mechanism formed of vertical rods passing between two separated rails of the track so as to abut the pallets supported thereon and means for powering the rods for rotational motion about the axis of the spiral to cause the pallets to move along the spiral and slide with respect to the rods.

Another object is to provide such an apparatus in which all the pusher rods are connected to a single powering apparatus which imparts a rotational motion to each of the rods at timed intervals.

A still further object is to provide such material handling apparatus with a cylindrical kiln containing equipment for generating steam so that concrete products supported on the pallets may be cured therein.

A still further object is to provide such apparatus wherein the motion of the pusher rods is achieved in timed relation to the delivery of pallets to the kiln from a block-making machine.

Other objects, advantages and applications of the present invention will be made apparent by the following detailed description of a preferred embodiment of the invention. The description makes reference to the accompanying drawings wherein:

FIGURE 1 is perspective view of a system for forming and curing cement blocks, including a block making machine, three automated kilns formed in accordance with the present invention connected in series with one another so that a block passes through all three of the kilns, a cubing machine operative to receive the cured blocks and to stack them for shipment, and material handling equipment disposed between the various units;

FIGURE 5 is an illustration of the index mechanism which drives the pusher rods.

Figure 1:
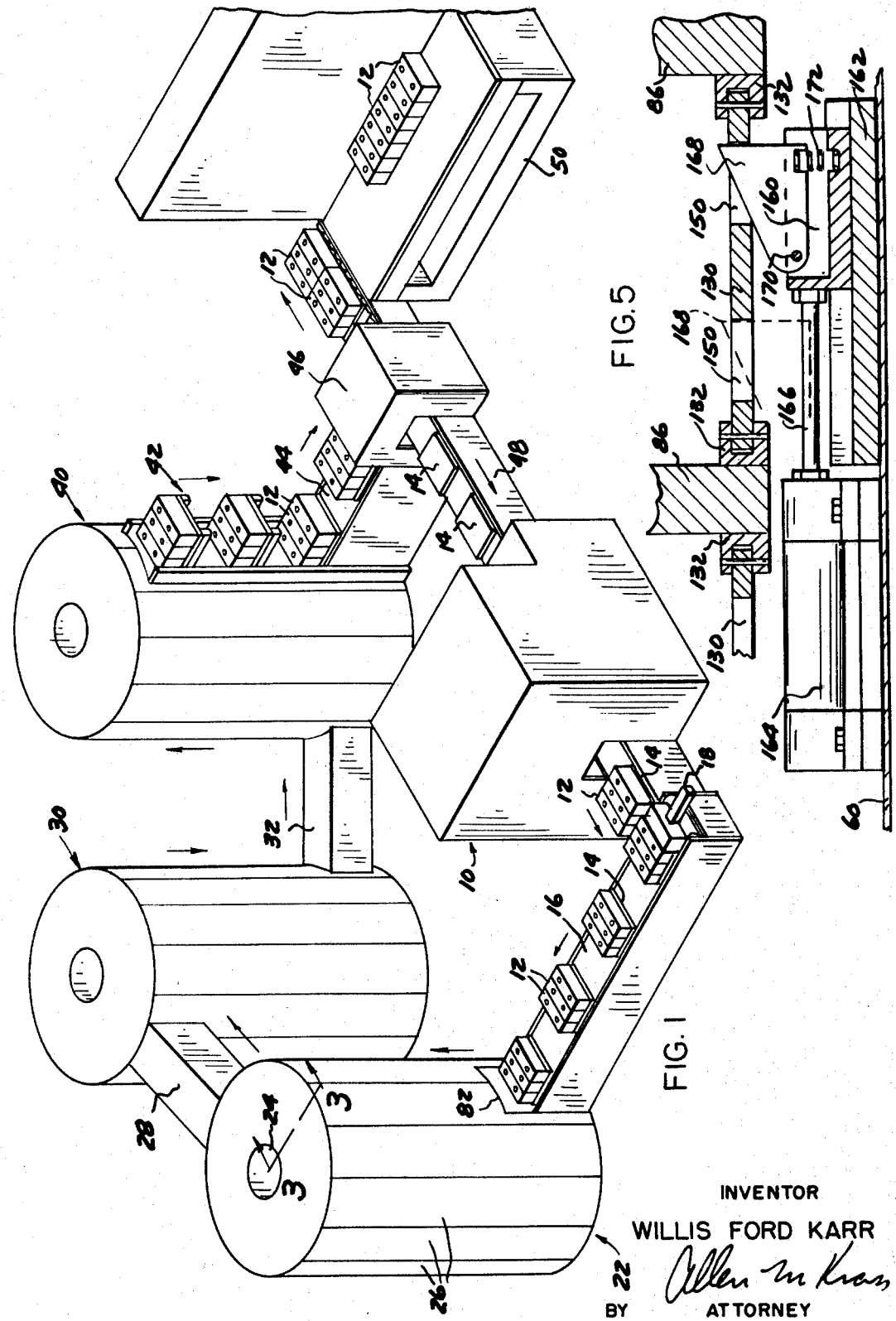

Referring specifically to FIGURE 1 wherein a general arrangement of the operation is disclosed, the concrete blocks 12 which constitute the output of the preferred embodiment of the invention are initially formed in a block-making machine generally indicated at 10. The specific nature of the machine is not of importance to the present invention. The uncured blocks 12 are fed out of the machine on pallets 14 which constitute flat boards formed of wood or metal. The output conveyer of the block-making machine feeds the pallets onto a conveyer 16 which is powered by a cylinder 18 and moves the blocks in an intermittent manner in timed relation to the output of the block-making machine 10 into the first kiln, generally indicated at 20. The kiln 20 constitutes an annular silo having a cylindrical outer surface 22 and a hollow inner core 24. Both the outer and inner vertical surfaces 22 and 24 are formed of removal panels 26 through which access may be had to the interior of the kiln. The blocks 12 move through the kiln which contains suitable apparatus for generating environment of heat and humidity (not shown) in a manner which will be subsequently described.

The blocks 12 move out of the kiln 20 through a covered tunnel 28 disposed at the top of the kiln which connects to a second kiln, generally indicated at 30 which is a duplicate of the first kiln 20. The pallets and the blocks then pass downwardly through the kiln 30 and exit through a tunnel 32 which connects to a third kiln generally indicated at 40. The output of the third kiln 40 is at its upper end to an elevator, generally indicated at 42 which moves the now cured blocks down to a horizontal output conveyer 44. The conveyer 44 carries the blocks to a pallet removal unit 46. The unit 46 removes the pallets from under the blocks and feeds the empty pallets back to the block-making machine 10 through a conveyer 48. The cured blocks 12 are fed to a cubing machine 50 which forms them into an array for shipment purposes.

The present invention specifically resides in the nature of the kilns 20, 30 and 40 and their associated material handling mechanism.

Figure 2:
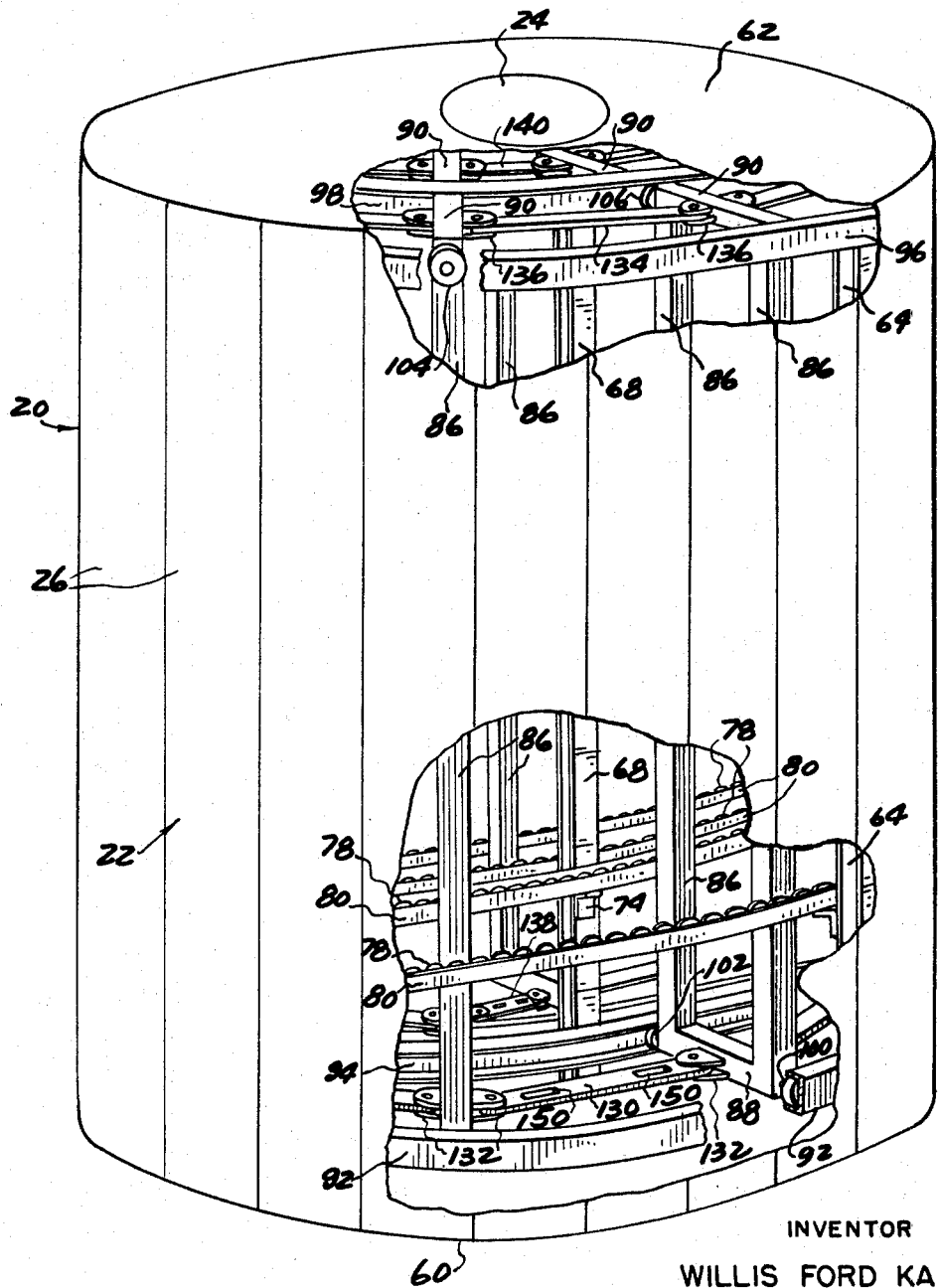
FIGURE 2 is a perspective view of one of the kilns of the present invention with a portion of its side broken away for purposes of illustrating the material handling apparatus disposed therein.

FIGURE 2 illustrates a kiln 20 which will be considered typical of the three kilns with a section broken away to disclose the inner mechanism. The removal panel members 26 are attached to their lower ends to an annular base member 60 and at their upper ends to an annular roof member 62 so as to form an enclosed annular space within the kiln. Steam and heated air may be either generated by suitable apparatus disposed within the kiln (not shown) or piped into the kiln from an external generator.

Three tiers of vertical support columns are arranged at spaced intervals within the kiln 20. One tier of support columns 64 is arranged immediately adjacent to the interior side of the outer wall 22 of the kiln. These columns will be termed the outboard support columns. Another tier of columns 66 is arranged immediately interior of the inner annular wall 24 of the kiln and these will be termed the inboard support columns. A third tier of columns 68 is arranged intermediate of the columns 64 and 66 and they will be termed the center support columns.

Figure 3:
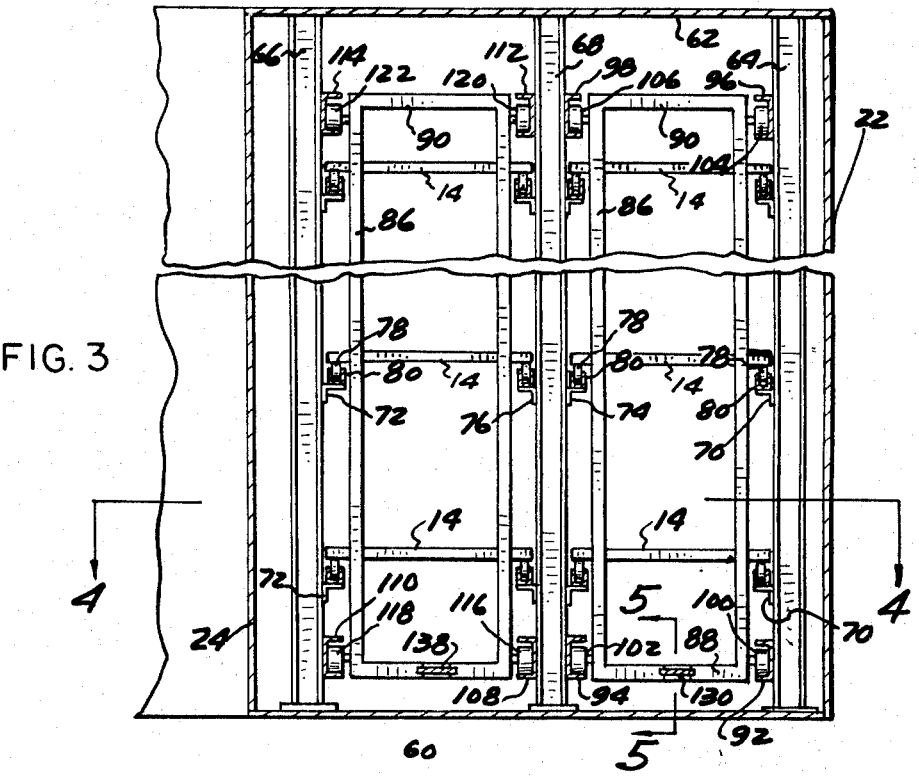
FIGURE 3 is a sectional view taken along lines 3—3 of FIGURE 2 and constituting a cross-section through a portion of the mechanical handling apparatus.
Figure 4:
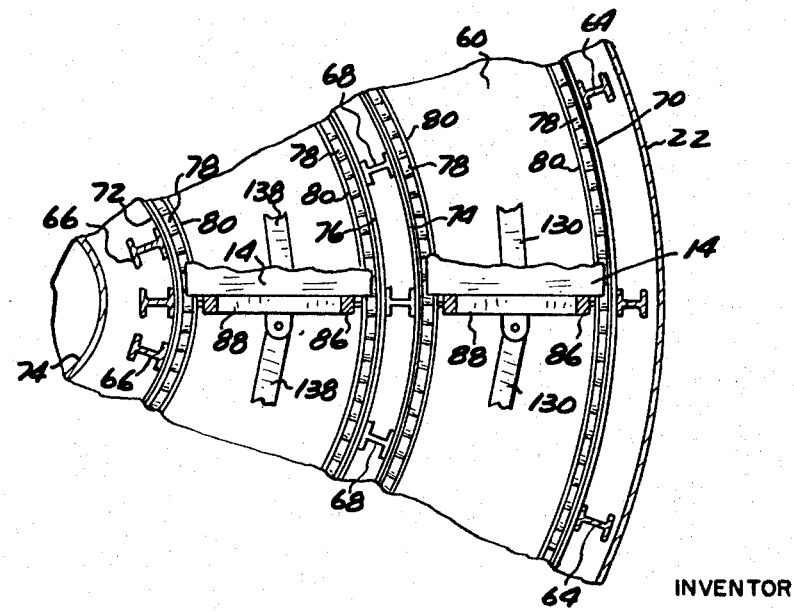
FIGURE 4 is a partial sectional view of the kiln taken along lines 4—4 of FIGURE 3.

As is best seen in FIGURE 3 the outboard columns support a spiraling rail 70 which is L-shaped in cross-section along its interior side. One leg of the rail is welded to the outboard columns 64 at regular intervals with adjacent contact points being elevated with respect to one another so as to form a spiral configuration. A similar track rail 72 is formed on the interior side of the inboard support columns 66 while a pair of similar tracks 74 and 76 are welded to both the inner and outer sides of the center support columns 68. The track 74 formed on the outer side of the center support column is opposed to the track 70 formed on the interior side of the outboard support column 64 so that the two rise together and form opposite sides of one horizontally spaced track. Similarly, the track 72 on the interior side of the inboard support column 66 and the track 76 on the opposing side of the center support column 68 are formed complementary to one another and the two constitute opposite sides of a single guide way.

Each of the tracks 70, 72, 74 and 76 supports a series of rollers 78 on its horizontally aligned upper surface. The rollers are spaced at fairly close regular intervals and are journaled for rotation about a horizontal axis on a pair of supports 80 which retain the axles of the rollers.

The rollers 80 are adapted to support the platens 14. A platen may straddle either the tracks 70 and 74 or 72 and 76. The conveyer 16 introduces the plates into the lower end of the kiln 20 through a vestibule door 82. Every other platen is loaded at the lower end between the rollers supported on the rails 72 and 76 and alternate platens are supported on the rollers between the tracks 70 and 74. The length of a platen 14 is such that it will rest on the rollers 78 disposed between an opposed pair of tracks and will clear the support columns which retain these tracks. The rollers retain the platens 14 in a generally horizontal attitude inclined by the pitch of the tracks. This pitch is sufficiently low to avoid damage to the blocks 12 supported on the platens which might be caused by the blocks sliding off the tracks.

The platens 14 are moved along the tracks by pusher rods which consist of elongated rectangular frames formed of two relatively long vertical steel beams 86 and short lower and upper connecting beams 88 and 90 respectively. Beams 86, 88 and 90 are welded into a rectangular shape. The distance between the outer edges of the vertical pusher members 86 is slightly less than the space between the opposed edges of the tracks and the distance between the lower connecting beam 88 and the upper connecting beam 90 is slightly less than the length of the support columns 64, 66, and 68.

A plurality of the pusher frames consisting of the vertical members 86 and the end members 88 and 90 are disposed at regular intervals between the outer tracks 70 and 74 and are supported for rotation about the axis of the kiln 20 by means of a pair of lower tracks 92 and 94 and a pair of upper tracks 96 and 98. The lower tracks 92 and 94 are respectively formed on the inner side of the outboard support column 64 below the lowest tier of the track 70 and on the outer side of the center support column 68 below the lowest tier of the spiral track 74. The tracks 92 and 94 are channel shaped in cross section with their central webs being attached to their respective columns and rollers 100 and 102 which are journaled to the lower edges of the outside of the vertical members 86 ride in these tracks. It should be emphasized that tracks 92 and 94 do not spiral upwardly but simply constitute a horizontal continuous rail disposed at the lower end of the support columns.

Similarly, the tracks 96 and 98 which are retained at the upper ends of the support columns retain rollers 104 and 107 which are journaled on the outer edges of the upper ends of the vertical beams 86. Again, the rails 96 and 98 do not spiral but simply constitute a horizontal track running around the top edge of the support columns. Similar lower tracks 108 and 110 and upper tracks 112 and 114 respectively support the rollers 116, 118, 120 and 122 of the inner series of pusher frames.

The pusher frames of the outboard tier are connected to one another by links 130 which are pivotally joined at each end to adjacent lower cross beams 88 by means of trunnion mounts 132 disposed on opposite sides of each of the lower cross beams 88. Similarly, links 134 join together the cross members 88 and 90 of the inner tier of pusher frames. These link connections allow the pusher frames to move as a unit on their support rails.

The links 130 which join the pusher frames are formed with a pair of elongated slots 150 adjacent to each of their ends. The pusher frames are driven through these slots 150 by an index drive mechanism disclosed in FIGURE 5. The drive is centered about a slide member 160 which is positioned within a set of gibs 162 that allow it to reciprocate directly below the links 130. The slide 160 is moved along the gibs 162 by means of a hydraulic cylinder 164 which is supported on the base 60 and has its rod 166 connected to the slide. A generally triangular shaped drive wedge 168 is pivotally supported within a center slot in the slide 160 by means of a pin 170. A spring 172 biases the wedge 168 into an outward position with respect to the slide 160 wherein it is capable of entering a slot 150 formed in one of the links 130.

With the drive in the position shown in the full lines in FIGURE 5 a stroke is achieved by first powering the cylinder 164 by suitable hydraulic circuitry so as to retract the rod 166 and bring the slide 160 into the phantom position shown in FIGURE 5. The inclined upper edge of the wedge 168 bears against the link 130 during this operation to move the wedge down against the force of the spring 172. When the slide 160 is retracted to a point where the wedge 168 reaches a slot 140 adjacent the next frame, the spring causes the wedge to enter the slot. The cylinder 164 is then actuated to cause its rod to extend, pushing the slide 160 in the direction of motion of the pusher frame. The forward edge of the drive wedge 168 bears against the forward edge of the slot 150 during this operation and causes the entire train of pusher frames to move. A similar slide (not shown) coupled to the inner tier of drive frames moves it simultaneously.

In this manner, the pusher frames are continuously rotated about the center axis of the kiln. Their forward edges bear against the platens 14 supported on the rollers 78. One pusher frame will bear against a number of platens on successively higher levels. As the drive mechanism rotates the pusher frames, all of the pallets are indexed along the inclined rails simultaneously. As the upper most platen reaches the end of its track it is moved by gravity through the tunnel 28 to the next kiln. In that kiln, the platens tend to roll down the inclined tracks and are prevented from rolling by the pusher frames which in this case are better termed stop frames.

In this manner, the power of the cylinder 164 is used to simultaneously index a large number of pallets through the kiln, without any complicated mechanism.

Having thus described my invention, I claim:

1. A material handling system, comprising:
   (a) a support means;
   (b) a first pair of track members arranged spirally about a vertical axis, one of said first pair of track members being mounted on said support means at a first radius with respect to said axis and the second of said track members being mounted on said support means at a second radius, greater than said first radius, so that the two track members are spaced horizontally with respect to one another;
   (c) a plurality of article supporting carriers each having one side supported on one of said first pair of track members and the other side supported by the other of said first pair of track members;
   (d) anti-friction means mounted on each of said first pair of track members so that said article supporting carriers roll on said track members between vertically spaced positions;
   (e) a second pair of track means arranged in a closed configuration about said vertical axis, one of said second pair of track means being vertically spaced above the second of said second pair of track means;
   (f) a series of vertical pusher members supported by said second pair of track means for movement in a closed path between said first pair of track members, said pusher members having a vertical height at least equal to the vertical extension of said first pair of track members;
   (g) means interconnecting adjacent pusher members so that said series moves as a unit along said closed path; and
   (h) drive means engageable with successive ones of said series of pusher members so that said series is progressively advanced around said closed path with individual pusher members abutting article supporting carriers disposed on said spiral track members to move said carriers along said first pair of track members.

2. A material handling system as defined in claim 1, including second anti-friction means arranged between each of said pusher members and said second pair of track means.

3. A material handling system as defined in claim 2, wherein said series of pusher members travel in a circular path around said vertical axis.

4. A material handling system as defined in claim 3, wherein each pair of adjacent pusher members are interconnected by flexible link means.

5. A material handling system as defined in claim 4, wherein said drive means comprises a drive member, means for reciprocating said drive member between positions adjacent the path of said pusher members, a wedge member mounted on said drive member for movement between a first position wherein cooperating abutments on said wedge member and one of said link means are interengaged when said drive member is extended in a direction corresponding to the direction of movement of said pusher members; and a second position wherein said cooperating abutments are disengaged when said drive member is retracted in a direction opposite to the direction of movement of said pusher members.

6. The conveyor of claim 1 wherein the anti-friction means consists of a plurality of rollers disposed at regular intervals along said first pair of track members and journalled for rotation with respect to the track members about horizontal axes.

7. A material handling system in accordance with claim 1 wherein the pusher members each consist of an elongated rectangular frame aligned with its length in the vertical direction with the side members of the frame having a separation less than the distance between said first pair of track members so that each of the frames abut an article supporting carrier supported on said first pair of track members at two points.

8. A kiln system for curing masonry articles comprising:
   (a) a vertical cylindrical structure having vertically spaced block receiving and discharge openings;
   (b) means for controlling the atmosphere within said structure for curing blocks as they are progressively advanced through said structure from said receiving opening to said discharge opening,
   (c) support means disposed within said cylindrical structure;
   (d) a first pair of track members arranged spirally about the vertical axis of said structure and extending from said receiving opening to said discharge opening, one of said first pair of members being mounted on said support means at a first radius with respect to said vertical axis, and the second of said first pair of members being mounted on said support means at a second radius, greater than said first radius, so that the two track members are spaced horizontally with respect to one another,
   (e) a plurality of block supporting carriers each having one side supported on one of said first pair of track members and the other side supported on the other of said first pair of track members;
   (f) anti-friction means disposed between said block supporting carriers and said first pair of track members so that the article supporting carriers roll on said first pair of track members between vertically spaced positions;
   (g) a second pair of track means arranged at a common radius about said vertical axis, one of said second pair of track means being vertically spaced above the second of said second pair of track means;
   (h) a series of vertical pusher members supported by said second pair of track means for movement in a closed path between said first pair of track members, said pusher members having a vertical height at least equal to the vertical extension of said first pair of track members, (i) means interconnecting adjacent pusher members so that said series of pusher members move as a unit along said closed path and, (j) drive means engageable with successive ones of said series of pusher members so that said series of pusher members is progressively advanced around said closed path with individual pusher members abutting article supporting carriers disposed on said first pair of track members to move the carriers through a controlled atmosphere from said block receiving opening to said discharge opening.

References Cited

UNITED STATES PATENTS

| 1,085,852 | 2/1914 | Duncan | 34—147 X |
| 1,151,111 | 8/1915 | McIntosh | 34—147 X |
| 1,789,177 | 1/1931 | Ipsen et al. | 263—28 |
| 2,007,009 | 7/1935 | Staples | 263—7 |
| 3,245,131 | 4/1966 | Kimble | 263—6 |

FREDERICK L. MATTESON, Jr., *Primary Examiner.*

D. A. TAMBURRO, *Assistant Examiner.*